United States Patent
Honjo et al.

(10) Patent No.: US 12,345,607 B2
(45) Date of Patent: Jul. 1, 2025

(54) GASKET CONNECTION RELIABILITY EVALUATION SYSTEM, GASKET CONNECTION RELIABILITY EVALUATION METHOD, AND PROGRAM

(71) Applicant: MITSUBISHI HEAVY INDUSTRIES, LTD., Tokyo (JP)

(72) Inventors: Shintaro Honjo, Tokyo (JP); Henry H. Ren, Houston, TX (US); Shunsaku Matsumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 17/972,776

(22) Filed: Oct. 25, 2022

(65) Prior Publication Data
US 2024/0133762 A1  Apr. 25, 2024
US 2024/0230449 A9  Jul. 11, 2024

(51) Int. Cl.
*G01M 3/00*  (2006.01)
*G01M 3/02*  (2006.01)
*G06F 30/28*  (2020.01)

(52) U.S. Cl.
CPC ............. *G01M 3/027* (2013.01); *G06F 30/28* (2020.01)

(58) Field of Classification Search
CPC ..... G01M 3/027; G01M 13/005; G06F 30/28; G06F 2113/08; G06F 2113/14
See application file for complete search history.

(56) References Cited

U.S. PATENT DOCUMENTS 10,746,015 B2   8/2020   Munda et al.
10,884,402 B2   1/2021   Subramaniyan et al.
(Continued)

FOREIGN PATENT DOCUMENTS

CN   203614651 U  *  5/2014
CN   108572069 A  *  9/2018   .......... G01M 13/005
(Continued)

*Primary Examiner* — Francis C Gray
(74) *Attorney, Agent, or Firm* — Birch, Stewart, Kolasch & Birch, LLP

(57) ABSTRACT

A system which evaluates a reliability of piping connections with gaskets is provided. A gasket connection reliability evaluation system includes: a measurement value acquisition unit configured to acquire a measurement value obtained through measurement by a sensor provided in a system including piping connections with gaskets; a simulation unit configured to simulate a behavior of a fluid flowing through the system on the basis of the measurement value and calculate a state quantity relating to the fluid; a loading analysis unit configured to analyze a loading applied to each of the gaskets on the basis of the measurement value and the state quantity and calculate a connection index of the gasket; a fatigue analysis unit configured to analyze a fatigue state of the gasket on the basis of the measurement value, the state quantity, the loading applied to the gasket, and a specifications and condition of the gasket connection and calculate a deterioration index of the gasket; and a reliability evaluation unit configured to calculate a reliability of the gasket on the basis of the measurement value, the state quantity, the connection index, the deterioration index, and a predetermined reliability evaluation model.

13 Claims, 9 Drawing Sheets

(56) References Cited

U.S. PATENT DOCUMENTS

| | | | | |
|---|---|---|---|---|
| 2008/0041165 A1* | 2/2008 | Coffey | ................ | G01M 13/005 |
| | | | | 73/761 |
| 2008/0053200 A1* | 3/2008 | Dhellemmes | ......... | G01M 3/027 |
| | | | | 73/49.8 |
| 2022/0056999 A1* | 2/2022 | Nahrwold | .............. | F16J 15/064 |

FOREIGN PATENT DOCUMENTS

| | | | | | |
|---|---|---|---|---|---|
| CN | 110274735 A | * | 9/2019 | .......... | G01M 13/005 |
| CN | 110489880 B | * | 6/2021 | | |
| DE | 0886088 B1 | * | 2/2005 | ........... | F16J 15/3492 |
| JP | 2018-25497 A | | 2/2018 | | |

\* cited by examiner

GASKET CONNECTION RELIABILITY EVALUATION SYSTEM, GASKET CONNECTION RELIABILITY EVALUATION METHOD, AND PROGRAM

BACKGROUND OF THE INVENTION

The present disclosure relates to a gasket connection reliability evaluation system, a gasket connection reliability evaluation method, and a program.

DESCRIPTION OF RELATED ART

In industries in which fluids such as oil and gas are handled, it is important to maintain piping connections through which fluids flow in a sealed state. Flanges and gaskets are generally used when connecting a certain piping to another piping or facility. Both flanges to be joined are rigid members and thus need to be machined and aligned. Adjusting these mutual positions is required for maintaining a sealed state when changing the usage conditions. However, achieving sealing may be difficult in some cases in consideration of the properties of alloys to be used for the facility, the fluids, process variables (vibration, temperature fluctuation, pressure fluctuation, internal fluid surges, frictional wear, chemical compatibility, and the like), and cost constraints (maintenance man-hours, product cost, and downtime). In such cases, the presence of gaskets is important. Gaskets are softer than rigid components to be joined and a gap between two members is filled with gaskets to prevent a fluid from leaking. The unevenness of a flange surface is filled and sealing is achieved due to an interaction of a force which tightens flanges and gaskets and an internal pressure. A failure of gaskets is the most important maintenance matter for plants in which fluids are handled. Accidents such as fire may occur due to fatigue of gaskets or leakage from a connection in some cases. Although monitoring the condition and health of gaskets to take appropriate measures before the failure of a gasket connection is required, such a method has not been proposed and it is often the case that a gasket failure is noticed after the fact in many cases. For example, although industrial gaskets are used in all fields such as oil and gas production sites, gas processing plants, deep water facilities, liquefied natural gas (LNG) facilities, pipeline transportation facilities, refineries, and petrochemical plants, different types of gaskets are used depending on the differences in usage environments. Many of these gaskets are not replaced on the basis of operating conditions or health, but on the occasion of system repairs or modifications. However, there is a likelihood of failure before a vendor recommended life depending on the operation conditions at the site in some cases.

As an associated technique, Patent Document 1 describes a technique which relates to a piping system such as that in a plant and calculates the lifespan of a piping due to corrosion and the probability of reaching the end of lifespan from a relationship between a usage period of a piping and an amount of wall loss. Patent Document 2 describes a system which acquires sensor information representing operation characteristics from a machine included in an oil and gas production facility and generates a digital model of a machine on the basis of a user input through a graphical user interface (GUI). Patent Document 3 describes an interactive monitoring system which visually displays an output value of a digital model of a machine of an oil and gas production facility. Patent Documents 1 to 3 do not describe a technique of evaluating a reliability of a connection by paying attention to a piping connection.

PATENT DOCUMENTS

[Patent Document 1] Japanese Unexamined Patent Application, First Publication No. 2018-25497
[Patent Document 2] Specification of U.S. patent Ser. No. 10/884,402
[Patent Document 3] Specification of U.S. patent Ser. No. 10/746,015

SUMMARY OF THE INVENTION

A method of monitoring a connection state and evaluating a reliability is required so that it is possible to deal with failure of a piping connection in advance.

The present disclosure provides a gasket connection reliability evaluation system and a gasket connection reliability evaluation method in which the above problems can be solved.

A gasket connection reliability evaluation system of the present disclosure includes: a measurement value acquisition unit configured to acquire measurement values obtained through measurement by a sensor provided in a system including piping connections with gaskets; a simulation unit configured to simulate a behavior of a fluid flowing through the system on the basis of the measurement values and calculate state quantities relating to the fluid; a loading analysis unit configured to analyze a loading applied to each of the gaskets on the basis of the measurement value and the state quantity and calculate a connection index of the gasket; a fatigue analysis unit configured to analyze a fatigue state of the gasket on the basis of the measurement value, the state quantity, the loading applied to the gasket, and a specifications and condition of the gasket connection and calculate a deterioration index of the gasket; and a reliability evaluation unit configured to calculate a reliability of the gasket on the basis of the measurement value, the state quantity, the connection index, the deterioration index, and a predetermined reliability evaluation model.

A gasket connection reliability evaluation method of the present disclosure includes: a step of acquiring a measurement value obtained through measurement by a sensor provided in a system including piping connections with gaskets; a step of simulating a behavior of a fluid flowing through the system on the basis of the measurement value and calculating a state quantity relating to the fluid; a step of analyzing a loading applied to each of the gaskets on the basis of the measurement value and the state quantity and calculating a connection index of the gasket; a step of analyzing a fatigue state of the gasket on the basis of the measurement value, the state quantity, the loading applied to the gasket, and a specifications and condition of the gasket connection and calculating a deterioration index of the gasket; and a step of calculating a reliability of the gasket on the basis of the measurement value, the state quantity, the connection index, the deterioration index, and a predetermined reliability evaluation model.

A program of the present disclosure causes a computer to execute: a step of acquiring a measurement value obtained through measurement by a sensor provided in a system including piping connections with gaskets; a step of simulating a behavior of a fluid flowing through the system on the basis of the measurement value and calculating a state quantity relating to the fluid; a step of analyzing a loading applied to each of the gaskets on the basis of the measurement value and the state quantity and calculating a connection index of the gasket; a step of analyzing a fatigue state of the gasket on the basis of the measurement value, the state quantity, the loading applied to the gasket, and a specifications and condition of the gasket connection and calculating a deterioration index of the gasket; and a step of calculating a reliability of the gasket on the basis of the measurement value, the state quantity, the connection index, the deterioration index, and a predetermined reliability evaluation model.

According to the gasket connection reliability evaluation system, the gasket connection reliability evaluation method, and the program described above, it is possible to evaluate a reliability of piping connections such as gaskets.

DETAILED DESCRIPTION OF THE INVENTION (System Constitution)

Figure 1:
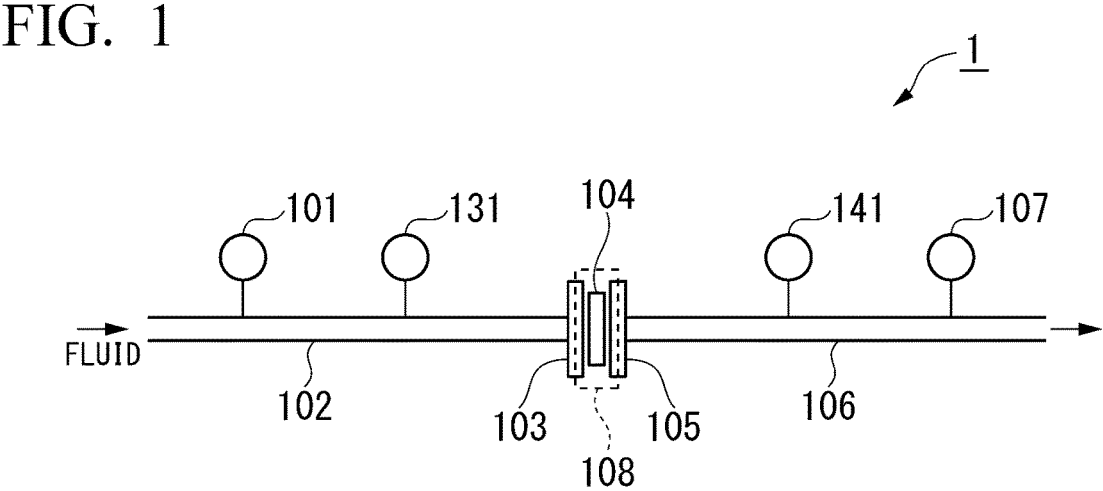
FIG. 1 is a diagram showing an outline of a piping system according to an embodiment.

FIG. 1 shows an outline of a piping system according to an embodiment. The piping system 1 includes a piping 102, a flange 103, a gasket 104, a flange 105, a piping 106, a real sensor 101, a virtual sensor 131, a virtual sensor 141, and a real sensor 107. Each of the real sensors 101 and 107 is one real sensor or a group of multiple real sensors. For instance, the real sensor 101 could be just pressure sensor, but also could be pressure and temperature sensors, etc. Similarly, each of the virtual sensors 131 and 141 is one virtual sensor or a group of several virtual sensors. In the piping system 1, the piping 102 and the piping 106 are disposed coaxially and the flange 103 is provided at an end portion of the piping 102. The flange 105 is provided at an end portion of the piping 106. The flange 103 and the flange 105 are disposed to have the gasket 104 disposed there between and face each other. The gasket 104 seals a gap between the flanges. Joining portions between the gaskets 104 and 104 and the flanges 103 and 105 are called gasket connections 108. In the piping system 1, a fluid flows in a direction of an arrow. The real sensor 101 and the virtual sensor 131 are provided on an upstream side of the gasket connections 108 in a direction in which the fluid flows and the virtual sensor 141 and the real sensor 107 are provided on a downstream side thereof. The real sensors 101 and 107 are sensors which are actual bodies configured to measure a temperature, a pressure, a flow rate, and the like of the fluid. The virtual sensors 131 and 141 calculate a fluid state quantity at a position in which the real sensor cannot be provided and an estimation value of a state quantity of a type in which measurement cannot be performed using the real sensor on the basis of a simulation model in which a state/behavior of the piping system 1 is simulated and measurement values obtained through measurement by the real sensors 101 and 107. The state quantity includes the operation conditions, physical properties, a chemical composition, and the like of the fluid flowing through the piping system 1. The operation conditions include, for example, a temperature, a pressure, a flow rate, and the like of the fluid. The physical properties include a gas/liquid ratio, a density, a viscosity, a specific heat, and the like. The chemical composition includes the content of $H_2O$, $CO_2$, $N_2$, hydrocarbons, sand, other impurities, and the like. The virtual sensors 131 and 141 calculate conditions under which the estimated state quantity (hereinafter referred to as a "virtual sensor value" in some cases) is measured (calculated). For example, the virtual sensors 131 and 141 calculate conditions when a virtual sensor value calculated by the virtual sensor 131 is a certain value, for example, measurement values of the real sensor 101 and 107, a degree of opening of a valve (not shown), and the like. In the piping system 1, there are many cases in which a real sensor configured to measure various state quantities at the gasket connection 108 is not provided. In addition, this makes it difficult to evaluate and monitor the health of the gasket connection 108. When the virtual sensors 131 and 141 are provided, evaluation of a reliability of the gasket connection 108 is allowed by clarifying the operation conditions and the fluid characteristics in the vicinity of the gasket connection 108. Positions and numbers of the real sensor and the virtual sensor in FIG. 1 are examples and are not limited to the illustrated aspects. In the piping system 1, a plurality of gasket connections 108 may be provided.

Figure 2:
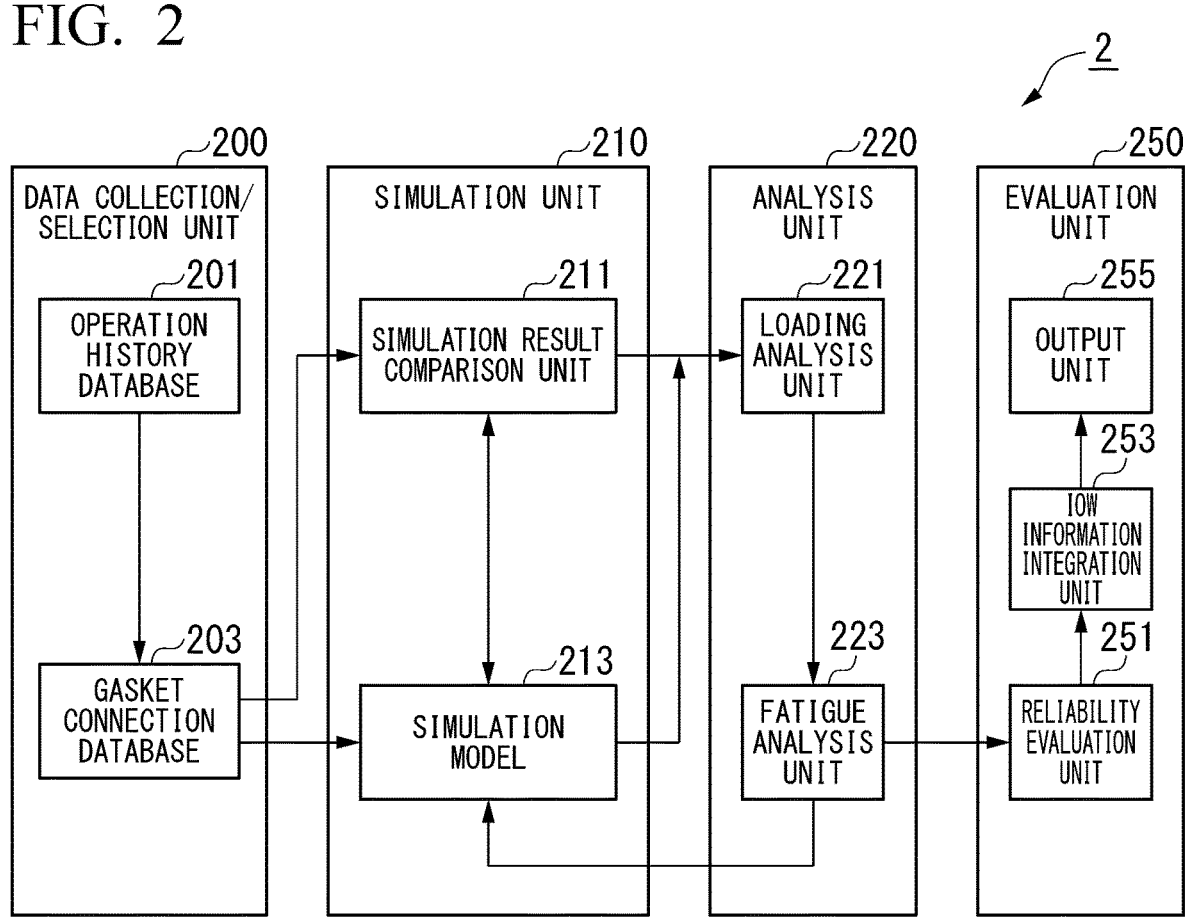
FIG. 2 is a diagram showing an example of a reliability evaluation system according to the embodiment.

FIG. 2 shows an example of the reliability evaluation system according to the embodiment. The gasket connection reliability evaluation system 2 is composed of one or more computers. The gasket connection reliability evaluation system 2 is a system in which a reliability of the gasket connection 108 is monitored and evaluated online or offline by utilizing a digital twin. The digital twin is a dynamic digital model of a physical system and is actually designed a bidirectional information flow. That is, it does not only say that it is to simulate a result to refer to, but also can display the real-time status changes. This is the biggest difference from the simulation. It is a dynamic bidirectional changing flow of information. The ultimate purpose of twinning is actually to generate valuable insights. Insights can in turn be applied to the original data objects. These things have been widely used in some industrial digital transformation applications. Four types of models are developed and used to predict a risk and a reliability of the gasket connection 108 using the digital twin.

A first model is a process simulation model in which a process in the vicinity of the gasket connection 108 is simulated. The simulation results are compared with a measurement value using the real sensor 101 or the like. Generally, parameters used for the comparison include a pressure, a temperature, a flow rate, and the like of the fluid. Engineering parameters such as a density, a velocity, a chemical composition, an occasional phase behavior, and the like can also be included in some cases. This model also serves as a virtual sensor network model for creating the required operation conditions at a connection location of the gasket 104.

A second model is a finite element method (FEA), a reduced basis finite element method (RBFEA) and/or a computational fluid dynamics (CFD) model. The second model is used for analyzing a loading applied to the gasket connection 108 and a fatigue state of a material of the gasket 104. In the analysis using the second model, the process includes starting with the selection of a gasket material (a metal, a non-metal, or a semi-metal), determining a loading state using an FEA or RBFEA model which is a steady state model, and quantifying a repulsive factor and a leakage factor. Furthermore, the fatigue state of the gasket material such as the deterioration factor and the reduction factor are quantified using the CFD model in which a dynamic effect provided to the gasket connection 108 by the fluid is analyzed. The second model is used for determining material fatigue boundaries of a structure and an operation range of a gasket connection system.

A third model is a series of machine learning (ML) models or an artificial intelligence (AI) models which depend on the following (1) to (3). Hereinafter, the machine learning model and the artificial intelligence model are described as an ML/AI model: (1) a strict process simulation model for predicting process conditions and engineering parameters in the vicinity of a gasket connection location, (2) understanding of the loading conditions of gaskets determined using the FEA or RBFEA model and determining the boundaries of safe operation, and (3) identification of a fatigue limit due to a temperature effect of the gasket material using the CFD model. That is to say, the series of ML/AI includes a virtual sensor ML/AI model which corresponds to (1) the strict process simulation model and in which processes in the vicinity of the gasket connection 108 are predicted faster, (2) a loading ML/AI model in which the repulsive factor, the leakage factor, and the like similar to the analysis results using the FEA or RBFEA model are predicted, and (3) a fatigue ML/AI model in which the deterioration factor, the reduction factor, the fatigue limit, the safe driving range, and the like similar to the analysis results using the CFD model are predicted. The virtual sensor ML/AI is built by learning data input/output by the first model, the loading ML/AI model is built by learning a relationship between the analysis results of the loading using the second model and input parameters used for the analysis, and the fatigue ML/AI model is built by learning a relationship between the analysis results of the fatigue state of the gasket material using the second model and input parameters used for the analysis.

A fourth model is a calculation model of a gasket connection reliability likelihood of failure (LOF) index in which a level of the overall safety guideline for the gasket connection 108 and the gasket material fatigue analysis is determined. This model is based on the above three types of ML/AI models and is a reliability ML/AI model in which a gasket connection reliability LOF index value is calculated in real time. For example, the reliability ML/AI model is built by learning a relationship between the output results of the virtual sensor ML/AI, the loading ML/AI, and the fatigue ML/AI and a gasket connection reliability LOF value calculated using a predetermined calculation method.

Based on the above description, an example of the function and constitution of the gasket connection reliability evaluation system 2 is described. The gasket connection reliability evaluation system 2 includes a data collection/selection unit 200, a simulation unit 210, an analysis unit 220, and an evaluation unit 250.

The data collection/selection unit 200 acquires and selects data required for evaluating a reliability of the gasket connection 108. The data collection/selection unit 200 includes an operation history database 201 and a gasket connection database 203. The operation history database 201 stores time history data such as the measurement value measured by the real sensors 101 and 107 and the operation state of the piping system 1. The history data of the virtual sensor value calculated using the virtual sensors 131 and 141 may be registered in the operation history database 201. The gasket connection database 203 stores information about specifications and states of various gaskets and flanges. The specifications include materials, sizes, and the like. The states include usage histories, accumulation fatigues, and the like. The information about the specifications is provided, for example, by a manufacturer of the gaskets. The information about the state is updated with the operation of the piping system 1. For example, a value associated with the fatigue state of the gasket connection 108 calculated using the fatigue ML/AI model described above can be registered in the gasket connection database 203 as information of the accumulation fatigue. The data collection/selection unit 200 selects data which matches or is closest to the specifications and the conditions of the gasket 104 and the flanges 103 and 105 from the gasket connection database 203.

The simulation unit 210 includes a simulation result comparison unit 211 and a simulation model 213. The simulation model 213 simulates the behavior of the fluid flowing through the piping system 1 and the state occurring in the piping system 1 due to the flow of the fluid if receiving given predetermined parameters. The simulation model 213 includes a strict process simulation model and the virtual sensor ML/AI model. The simulation unit 210 acquires history data of the measurement values of the real sensors 101 and 107 and the specifications and the conditions of the gasket 104 and the flanges 103 and 105 from the data collection/selection unit 200 and inputs the history data, the specifications, the conditions to the simulation model 213. The simulation unit 210 acquires information indicating the accumulation fatigue of the gasket connection 108 from the analysis unit 220 and inputs the information to the simulation model 213. The simulation unit 210 causes the simulation model 213 to simulate the state of the piping system 1 if receiving the parameters to be input. The simulation model 213 calculates various state quantities associated with the piping system 1. For example, the simulation model 213 calculates a temperature, a pressure, a flow rate, and the like of the fluid flowing through the piping system 1. The calculation result of the simulation model 213 includes the state quantity calculated using the virtual sensors 131 and 141. The simulation result comparison unit 211 screens the calculation results using the simulation model 213. For example, the simulation result comparison unit 211 replenishes missing data by performing correction calculation or the like if data is missing. The simulation unit 210 outputs the calculation result using the simulation model 213 and the replenished data to an analysis unit 220. The output data includes the fluid state quantity (virtual sensor value) in the vicinity of the gasket connection 108.

The analysis unit 220 includes a loading analysis unit 221 and a fatigue analysis unit 223. The loading analysis unit 221 analyzes the loading applied to the gasket 104 and calculates the connection index and the like of the gasket 104 on the basis of a measurement value using the real sensor 101 or the like registered in the operation history database 201 and a virtual sensor value using the virtual sensor 131 or the like calculated using the simulation unit 210. The connection index includes a repulsive factor and a leakage factor of the gasket 104. The repulsive factor is a value obtained by indexing a repulsive force of the gasket against a tightening force using a predetermined calculation expression and the leakage factor is a value obtained by indexing an amount of fluid leaking from the gasket connection 108 using a predetermined calculation expression. The higher a value of the repulsive factor, the healthier a state indicated for the gasket connection 108 is (there is no failure or leakage of the gasket 104) and the smaller the value of the leakage factor, the healthier the state indicated for gasket connection 108 is. The loading analysis unit 221 performs simulations of a finite element method (FEA), a reduced basis finite element method (RBFEA), and computational fluid dynamics (CFDs) on gaskets with various specifications and creates gasket loading databases and libraries. Loading boundary values (operation range), limit values (upper limit values), repulsive factors, leakage factors, and the like are registered in the gasket loading databases and libraries.

The fatigue analysis unit 223 analyzes the fatigue state of the gasket 104 and calculates the deterioration index and the fatigue factor of the gasket 104 on the basis of the measurement value using the real sensor 101 or the like registered in the operation history database 201, the virtual sensor value using the virtual sensor 131 or the like calculated using the simulation unit 210, the loading applied to the gasket 104, and the specifications and the condition (gasket connection database 203) of the gasket connection 108. The deterioration index includes the degradation factor and the reduction factor of the gasket 104. The deterioration factor is a value obtained by indexing a degree of deterioration of a sealing ability using a predicted calculation expression and the reduction factor is a value obtained by indexing an amount of reduction of members constituting the gasket 104 using a predetermined calculation expression. The deterioration factor and the reduction factor are temperature-related factors. The deterioration factor indicates that the smaller the value, the healthier the gasket connection 108 is and the reduction factor indicates that the higher the value, the healthier the gasket connection 108 is. The fatigue factor is a value indicating how fatigued the gasket 104 is. The fatigue analysis unit 223 performs CFD analysis on gaskets with various specifications and creates gasket material fatigue analysis databases and libraries on the basis of these analysis results and the experimental results associated with the deterioration performed by vendors or the like. The deterioration factor, the reduction factor, the fatigue limit (upper limit value of the fatigue factor), and the like are registered in the gasket material fatigue analysis databases and libraries. The analysis unit 220 outputs a loading analysis result of the gasket connection 108 and a fatigue analysis result to the evaluation unit 250.

The evaluation unit 250 integrates the processing results obtained using the data collection/selection unit 200, the simulation unit 210, and the analysis unit 220 to evaluate a reliability of the gasket connection 108. The evaluation unit 250 includes a reliability evaluation unit 251, an integrity operating windows (IOW) information integration unit 253, and an output unit 255. The reliability evaluation unit 251 calculates a gasket connection reliability LOF index on the basis of the measurement value using the real sensor 101 and the like recorded in the operation history database 201, the virtual sensor value obtained using the virtual sensor 131 and the like calculated using the simulation unit 210, the connection index calculated using the loading analysis unit 221, the deterioration index calculated using the fatigue analysis unit 223, and the reliability ML/AI model (fourth model described above). The IOW information integration unit 253 calculates the range of state quantities allowed in the piping system 1 and the recommended range and limits of management and an operation using the connection index, the degradation index, the upper limit value of the loading and the fatigue factor, the gasket connection reliability LOF index, and the like. The output unit 255 outputs the measurement value, the virtual sensor value, the connection index, the degradation index, the gasket connection reliability LOF index, the upper limit value of the loading and the fatigue factor, the information about the operation range and limits, and the like to a display device, an electronic file, and the like.

Figure 3:
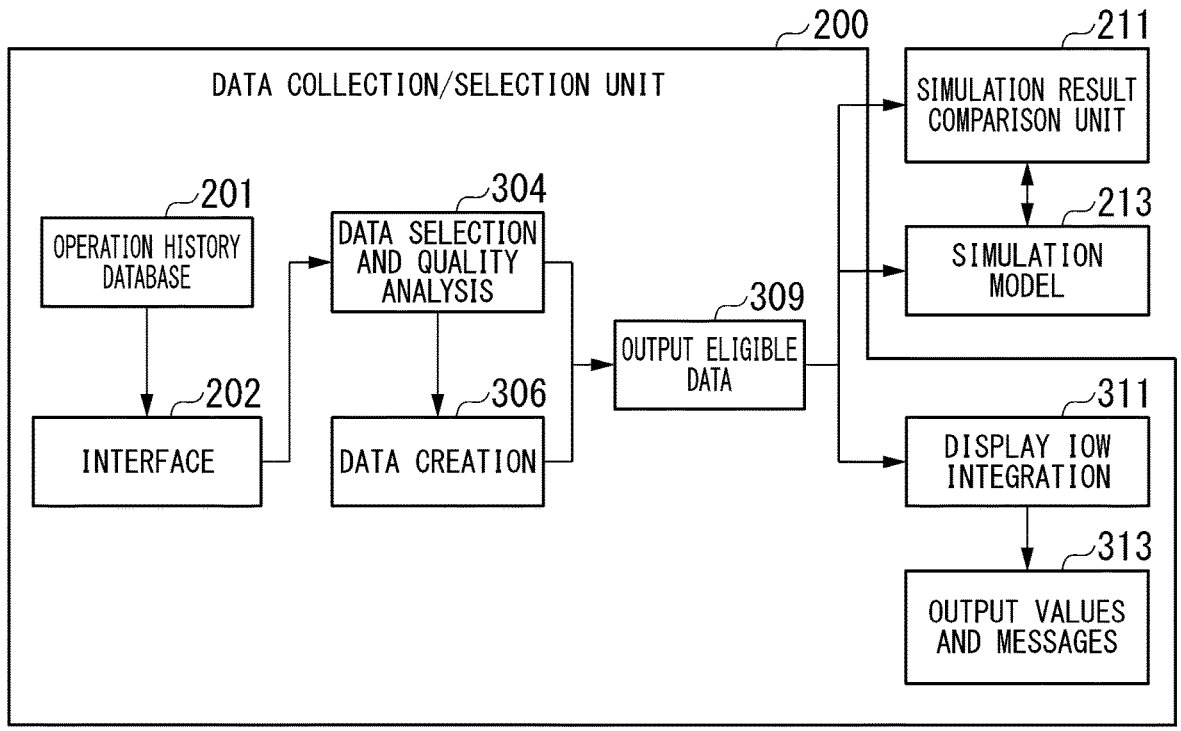
FIG. 3 is a diagram showing an example of processing of a data collection/selection unit according to the embodiment.

FIG. 3 shows an example of processing of the data collection/selection unit 200 according to the embodiment.

The time history data of the measurement value using the real sensors 101 and 107 stored in the operation history database 201 is acquired through an interface 202 and data selection and eligibility determination are performed (304). Data with missing or missing values is determined to be ineligible. With regard to the data determined to be ineligible, the measurement value using the real sensors 101 and 107 is estimated using a predetermined data creation model. The data creation model is a model built by learning the data determined to be eligible. For example, the data creation model estimates a true value of the ineligible portion from the data before and after the portion determined to be ineligible in time series. The data creation model creates a true value of the data determined to be ineligible (306). The data determined to be eligible, and the corrected eligible data determined to be ineligible and created using the data creation model are output to the simulation result comparison unit 211 and the simulation model 213 (309). The data collection/selection unit 200 performs IOW integration display for the eligible data (data determined to be eligible and data corrected using the data creation model) (311). For example, information indicating whether the temperature, the pressure, the flow rate, and the like measured using the real sensors 101 and 107 are within an appropriate range is displayed on the display device or the like. Furthermore, the data collection/selection unit 200 displays values such as the temperature, the pressure, the flow rate, and various messages (for example, the expressions "fluid status is normal" and the like) on the display device (313). The information to be displayed may be selectable by a user.

Figure 4:
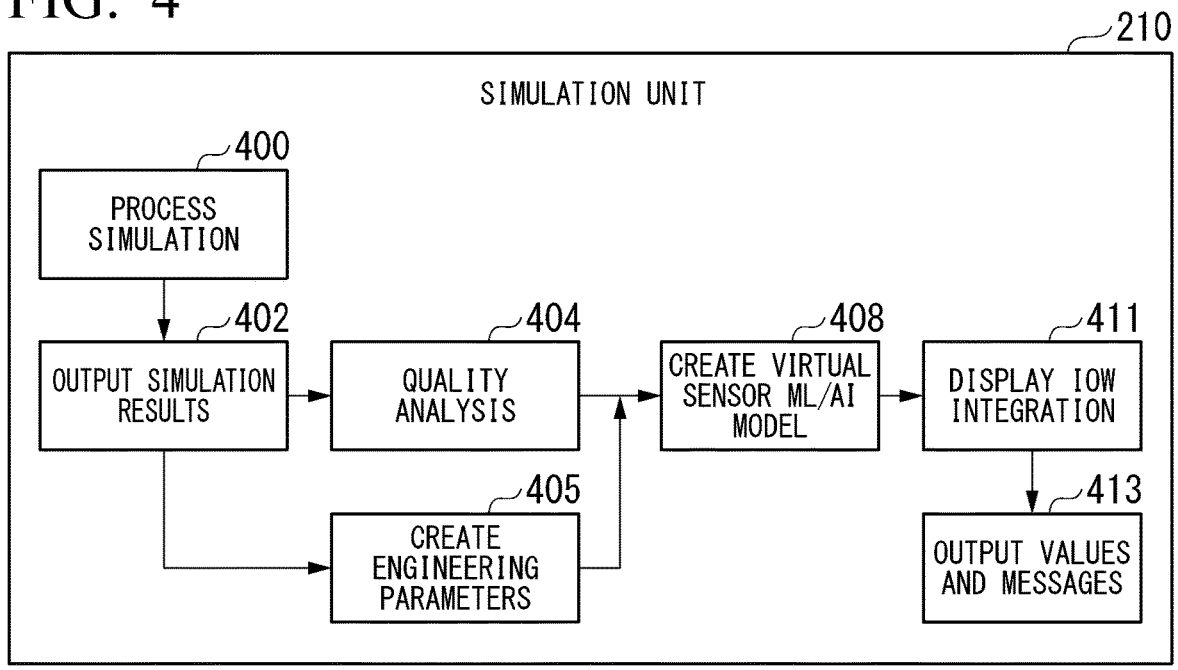
FIG. 4 is a diagram showing an example of processing of a simulation unit according to the embodiment.

FIG. 4 shows an example of processing of the simulation unit 210 according to the embodiment.

In the simulation unit 210, a process simulation (400) includes processing using the simulation model 213 and the simulation result comparison unit 211 described with reference to FIG. 2. The process simulation (400) includes acquiring the information about the specifications of the gasket connection 108 from the gasket connection database 203 and simulating the processing of the piping system 1. Furthermore, the simulation results are output (402). Subsequently, from the simulation results, the virtual sensor value measured using the virtual sensors 131 and 141 is extracted and quality analysis is performed (404). For example, the virtual sensor value obtained using the virtual sensors 131 and 141 is screened to remove/correct missing, skipped values, or the like. The correct eligible virtual sensor value is transmitted to a step of creating the virtual sensor ML/AI model (408). On the other hand, engineering parameters are created from the simulation results (405). The engineering parameters include the physical properties (gas/liquid ratio, density, viscosity, specific heat, and the like) of the fluid, the chemical composition (H2O, CO2, N2, hydrocarbons, and the like), and the like. The virtual sensor ML/AI model creation (408) includes learning the simulation results using the process simulation (400), the engineering parameters, and the virtual sensor value to create the virtual sensor ML/AI model. For example, the virtual sensor model is the ML/AI model built by learning a relationship between some parameters of the simulation results using the process simulation (400) (for example, state quantity and the like at the positions of the real sensors 101 and 107) and the virtual sensor value (404) using the engineering parameters (405) and the virtual sensors 131 and 141. The ML/AI model is (1) the virtual sensor ML/AI model of the third model described above. If the virtual sensor ML/AI model can be created (408), the operation conditions in the vicinity of the gasket connection 108 (for example, virtual sensor value obtained using the virtual sensors 131 and 141) and the bulk characteristics (engineering parameters such as velocity and density) can be calculated at high speed and low cost (low loading) using the created virtual sensor ML/AI model. The simulation unit 210 performs an IOW integration display on the virtual sensor values of the virtual sensors 131 and 141 calculated using the virtual sensor ML/AI model (411). For example, information indicating whether the virtual sensor value such as the temperature, the pressure, and the flow rate is within an appropriate range is displayed on the display device or the like. Furthermore, the simulation unit 210 displays virtual sensor values such as the temperature, the pressure, the flow rate, and various messages (for example, the expressions "fluid state is normal" and the like) on the display device (413). The information to be displayed may be selectable by a user. The virtual sensor ML/AI model creation (408) may be performed repeatedly as the learning data is accumulated so that sufficient accuracy can be obtained. Although only one gasket connection 108 is illustrated in FIG. 1, when the piping system 1 includes a plurality of gasket connections, the virtual sensor model is created for each of the gasket connections.

[0 0 0 1]

Figure 5:
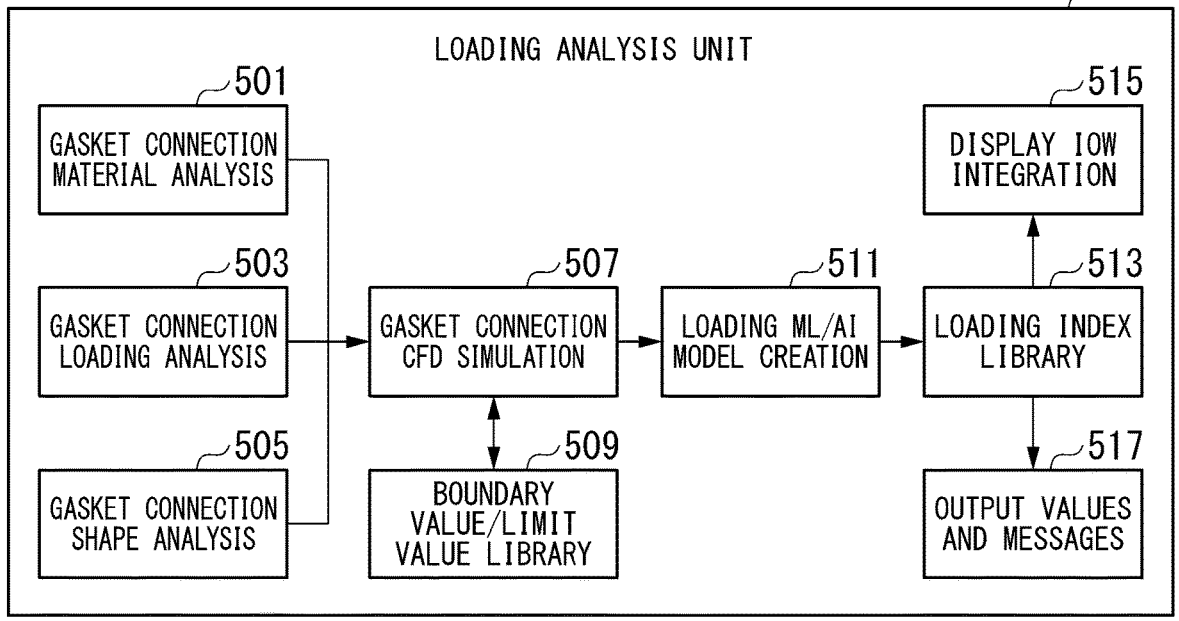
FIG. 5 is a diagram showing an example of processing of a loading analysis unit according to the embodiment.

FIG. 5 is a diagram showing an example of processing of the loading analysis unit 221 according to the embodiment.

A gasket connection material analysis (501) includes analyzing a material of the gasket 104. For example, the gasket 104 is classified into one of three material categories: non-metals (soft) gaskets, semi-metals gaskets, and metals gaskets. A gasket connection loading analysis (503) includes analyzing a loading applied to the gasket connection 108 using the FEA and/or the RBFEA. A gasket connection shape analysis (505) includes analyzing a connection shape/a connection type of the gasket connection 108. For example, a category of the connection shape of the gasket connection 108 is determined from a positional relationship of the piping to be connected. A gasket connection CFD simulation (507) includes acquiring material analysis, loading analysis, and shape analysis results and performing CFD simulation. The parameters which affect the gasket 104 are as follows. That is to say, the parameters include laboratory analysis associated with operation conditions (temperature, pressure, and flow rate), fluid characteristics (bulk characteristics and chemical composition), a connection compression factor (stretching pressure), a gasket allowable leakage rate and an amount of leakage (leakage factor), bolt torque, friction, and fatigue of a force (repulsive factor) gasket material, limitations (reduction factor and deterioration factor), and the like. The gasket connection CFD simulation (507) includes collecting all the above information on the basis of a material of the gasket 104, a connection shape of the gasket connection 108, operation conditions, and a loading state, performing CFD analysis, and determining a tightening compression pressure range and a boundary of a bolt on the basis of the materials and the connection shapes of various types of gaskets. The loading range, the upper limit value, and the like obtained using the CFD simulation (507) are registered in a boundary value/limit value library 509. The gasket connection CFD simulation (507) is performed in a number of case studies.

[0 0 0 2]

In the loading analysis (502 and 507), analysis is performed from the viewpoints of (a) a loading state, (b) loading conditions, and (c) a loading history. (a) The loading state indicates a compression level of a gasket due to flange tightening. The loading state is stationary and does not change rapidly over time. (b) The loading conditions are determined using a relationship between operation conditions of a gasket and an internal fluid and fluid characteristics such as corrosion and flow patterns and change over time. Thus, analysis needs to be performed as a dynamic behavior. (c) The loading history includes performing analysis with reference to the information in the past such as various experiment data of the gasket material and case studies of loading states which are likely to relate to different ranges of loading state analysis. (a) The loading state analysis includes determining the loading and the tension to the gasket using the FEA and/or the RBFEA. Thus, parameters for determining deterioration conditions using ambient environment conditions such as gasket fatigue conditions, leakage conditions, and internal fluid conditions are generated. (b) The loading condition analysis includes performing simulation in consideration of changes in operation conditions such as fluid characteristics, a fluid behavior, a pattern, a pressure, and a temperature and calculating a loading applied to the gasket. Changes in temperature affect parameters associated with the lifetime of the gasket material such as the deterioration factor and the reduction factor. For example, an operation at high temperature and high pressure is likely to cause the gasket to deteriorate faster than during a stable operation and it can be said that the same applies to when the fluid contains corrosive compounds or high hardness sand/solid particles. The loading condition analysis includes analyzing damage to the gasket based on the characteristics and the behavior of the fluid. (c) The loading history includes observing and comparing long-term changes in loading state and loading conditions on the basis of the time history data of the loading state and the loading conditions.

The loading ML/AI model creation (511) includes creating an ML/AI model in which the analysis results using the FEA, the RBFEA, and the CDF are learned, and for example, if the material of the gasket 104, the operation conditions of the fluid passing through the gasket connection 108, the fluid characteristics, the connection compression factor, tightening torque, or the like is input, the repulsive factor, the leakage factor, the loading boundary value, the limit value, and the like are output. The model to be created is the loading ML/AI model for predicting (2) the repulsive factor, the leakage factor, and the like in the third model described above. Subsequently, the repulsive factor and the leakage factor which are calculated using the loading ML/AI model are converted into a database or a library (for example, loading index library 513). A gasket material (metal, non-metal, or semi-metal), a size, a connection shape of the gasket connection 108, operation conditions (temperature, pressure, flow rate, or the like), characteristics (bulk characteristics and chemical composition) of the fluid, a connection compression factor (stretching pressure), a gasket allowable leakage rate, a leakage factor (amount of leakage), bolt torque, friction, a repulsive factor (repulsive force), and the like are associated with each other and are registered in the loading index library 513. The loading analysis unit 221 performs an IOW integration output on the value registered in the loading index library 513 (515). For example, information indicating allowable ranges of a connection compression factor, a leakage rate, a leakage factor, torque, friction, a repulsive factor, and the like is displayed on the display device or the like. Furthermore, the loading analysis unit 221 displays values such as a repulsive factor and a leakage factor and various messages (for example, the expressions "repulsive factor is normal" and the like) on the display device (517).

Figure 6:
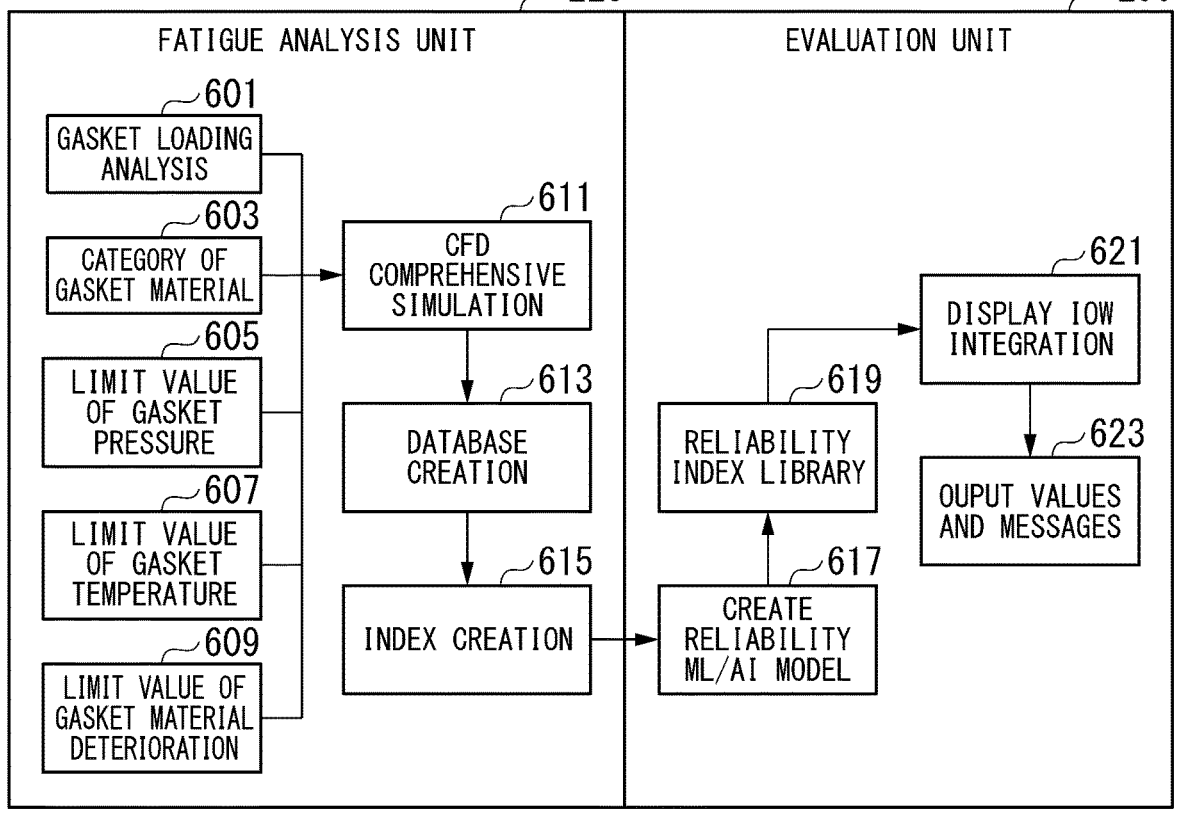
FIG. 6 is a diagram showing an example of processing of a fatigue analysis unit according to the embodiment.

FIG. 6 is a diagram showing an example of processing of the fatigue analysis unit 223 according to the embodiment.

The fatigue analysis unit 223 acquires loading analysis results (601) using the loading analysis unit 221, information (603) of a type of gasket material (any of a metal, a non-metal, or a semi-metal), a limit value (605) of a gasket pressure (loading) from the boundary value/limit value library 509 or the loading index library 513, a limit value (607) of a gasket temperature from the gasket connection database 203, and a deterioration limit value (609) of the gasket material. The CFD comprehensive simulation (611) includes calculating the fatigue state of the gasket material by performing the fluid analysis on the basis of these data. The CFD comprehensive simulation includes building the fatigue ML/AI model for calculating the fatigue state and the fatigue limit of the gasket material and performing calculation using this model. The ML/AI model is built, for example, by learning a relationship between parameters such as the gasket material, the operation conditions, the loading, and the temperature profile and various parameters associated with the fatigue of the gasket material such as the reduction factor, the deterioration factor, and the fatigue factor on the basis of laboratory test results, loading analysis results, or the like. This ML/AI model is the fatigue ML/AI model for predicting (3) the deterioration factor, the reduction factor, the fatigue limit, and the safe driving range in the third model. Database creation (613) includes converting the calculation results or the like of the fatigue state of the gasket material using the CFD comprehensive simulation (611) into a database or a library. The loading state of the gasket 104, the temperature profile (for example, time history data of the temperature of the fluid), the fluid bulk characteristics, the repulsive factor, the leakage factor, the material fatigue limit, the reduction factor, and the deterioration factor are associated with each other and are registered in the database or the library. Index creation (615) includes creating the deterioration index (reduction factor and deterioration factor) (615).

Subsequently, the evaluation unit 250 (reliability evaluation unit 251) creates the reliability ML/AI model which calculates a gasket connection reliability LOF index (617). The input parameters for creating the ML/AI model include the operation conditions, the gasket loading analysis results, the material category and fatigue analysis, the gasket pressure boundary (limit value of the loading), the temperature boundary (limit value of the temperature), the deterioration factor, the reduction factor, the repulsive factor, and the leakage factor which are obtained through the processes which have been described above. The evaluation unit 250 creates the reliability ML/AI model which calculates a gasket connection reliability LOF index value of 0 to 100, for example, if the input parameters described above are provided using, as 100, a state in which the parameters such as the loading applied to the gasket, the temperature of the fluid, the deterioration factor, the reduction factor, the repulsive factor, and the leakage factor exceed (or are expected to exceed) the limit value. The gasket connection reliability LOF index value indicates that the larger the value, the higher the possibility of failure. This reliability ML/AI model is the above-described fourth model. The evaluation unit 250 (reliability evaluation unit 251) calculates a gasket connection reliability LOF index for three materials of the gasket and a wide range of operation conditions if the reliability ML/AI model is created and stores the calculation results thereof as a reliability LOF index library (619). The evaluation unit 250 performs an IOW integration display on the basis of the reliability LOF index library (621). The evaluation unit 250 outputs a limitation, a reduction factor, a leakage factor, a warning message, and the like of the gasket connection reliability LOF index to a display device or the like (623).

Figure 7A:
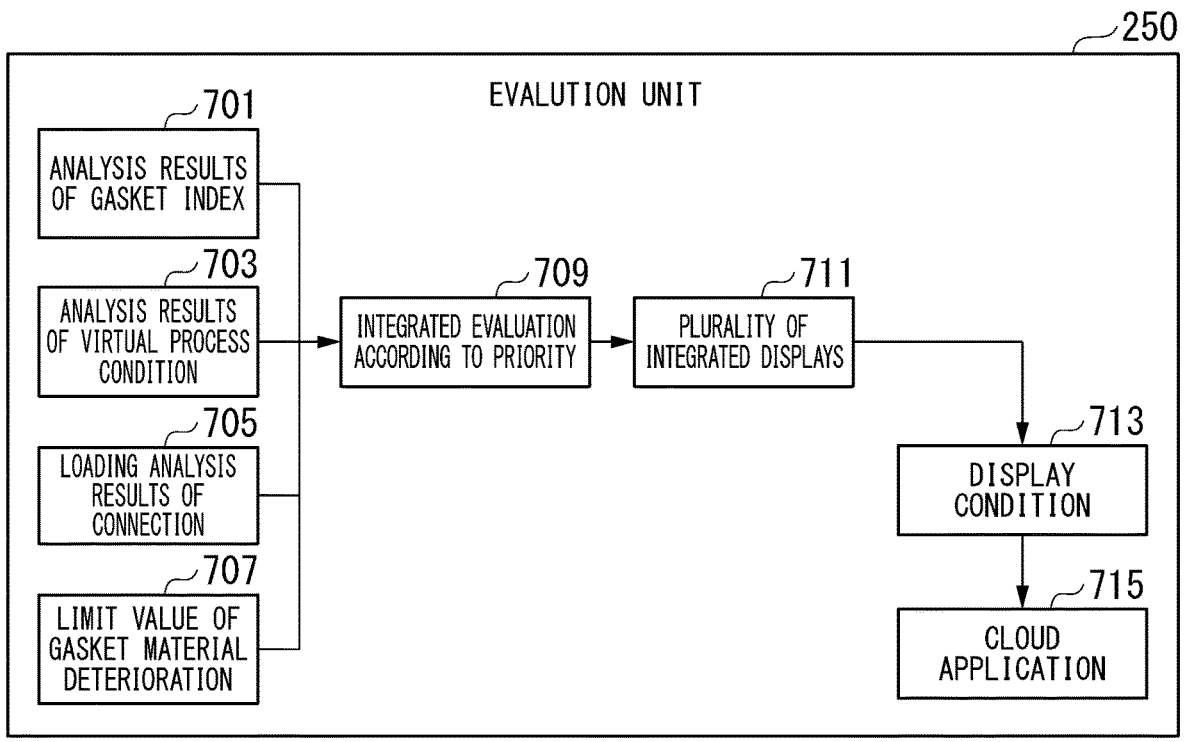
FIG. 7A is a diagram showing an example of processing of an evaluation unit according to the embodiment.

FIG. 7A is a diagram showing an example of processing of the reliability evaluation unit according to the embodiment.

Figure 7B:
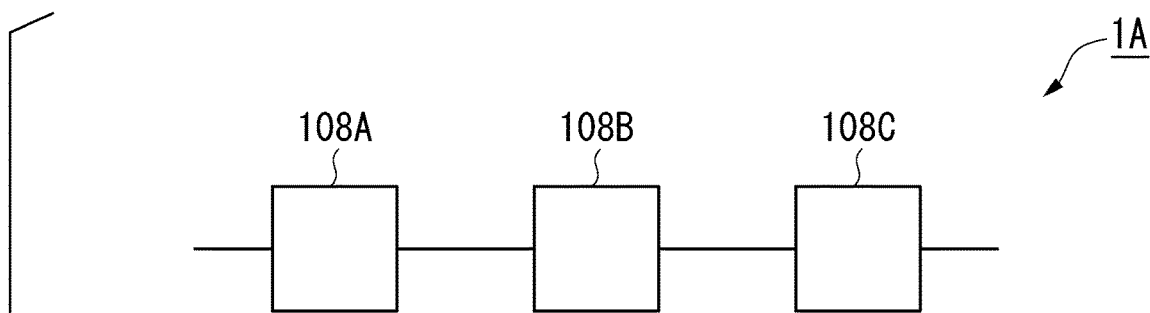
FIG. 7B is a diagram showing an example of processing of a failure rate evaluation according to the embodiment.

The evaluation unit 250 acquires the analysis results of a gasket index (701). The gasket index includes the reduction factor, the repulsive factor, the deterioration factor, the leakage factor, and the gasket connection reliability LOF index value. The evaluation unit 250 acquires the analysis results of a virtual process state (703). The evaluation unit 250 acquires a virtual sensor value using the simulation unit 210. The evaluation unit 250 acquires the loading analysis results for the gasket connection 108 using the loading analysis unit 221 (705). The evaluation unit 250 acquires a limit value of the gasket material deterioration using the fatigue analysis unit 223 (707). For example, the evaluation unit 250 acquires a value of a material fatigue limit calculated using the CFD comprehensive simulation (611). The evaluation unit 250 performs integrated evaluation according to a priority (709). For example, when there is a plurality of gasket connections 108, the evaluation unit 250 selects a gasket connection 108 which has a high priority from among the plurality of gasket connections 108 and evaluates a reliability of the selected gasket connection. For example, if there are three gasket connections 108A to 108C as gasket connections having a high priority and it is assumed that a gasket connection reliability LOF index value of the gasket connection 108A is A, a gasket connection reliability LOF index value of the gasket connection 108B is B, and a gasket connection reliability LOF index value of the gasket connection 108C is C, the evaluation unit 250 performs integrated evaluation associated with the gasket connection having a high priority by calculating the gasket connection reliability LOF index values using $(1-(1-\alpha \times A/100) \times (1-\beta \times B/100) \times (1-\gamma \times C/100)) \times 100$. $\alpha$, $\beta$, and $\gamma$ are weighting. The calculation of the gasket connection reliability LOF index value for high priority gasket connections can be calculated using a series model as shown in FIG. 7B. In System 1A, gasket connections 108A—108C are connected in series. If any one of the gasket connections 108A-108C fails, system 1A will cease to operate. If we assume that the gasket connection reliability LOF index value is similar to the failure rate the probability of this system 1A operating without failure can be calculated by $(1-A/100)\times(1-B/100)\times(1-C/100)$. Then the failure rate of system 1A can be calculated as $1-(1-A/100)\times(1-B/100)\times(1-C/100)$. Considering that the gasket connection reliability LOF index value has the similar meaning as the failure rate, the gasket connection reliability LOF index value can be calculated using the above formula, taking into account the weighting to the gasket connections 108A-108C. Greater weighting is possible for the important gasket connection 108. If the gasket connections 108A is critical (e.g., if failure of the gasket connections 108A would cause more serious damage, etc.), the failure rate of 108A may be estimated large with a margin to ensure greater safety. In that case, a greater weighting can be attached to the failure rate of 108A. Subsequently, the evaluation unit 250 provides a plurality of integrated displays (711). The evaluation unit 250 displays a list so that the gasket connection 108 which is in a critical state (for example, the gasket connection reliability LOF evaluation value increases) is ranked high or displays the factors, as a result of the integrated evaluation according to the priority. Furthermore, alerts may be displayed to get an operator's attention. Subsequently, the evaluation unit 250 displays the analysis results and the gasket connection reliability LOF index value so far as information indicating a state of the gasket connection 108 based on the digital twin (713). Various displays including a map or the like configured to show the state of the gasket connection 108 are provided. For example, a working region map of a gasket connection reliability LOF index value showing a stable or unstable range, a prediction diagram of the gasket connection reliability LOF index value, a constitution diagram around the gasket connection 108 showing a measurement value of the real sensor, a virtual sensor value using the virtual sensor, and the like, an alert, analysis results and a location associated with critical failure, and the like are displayed. Furthermore, the evaluation unit 250 works with a cloud application to monitor the piping system 1 and outputs the information obtained through the analysis so far to the cloud application (715).

As described above, the data collection/selection unit 200 identifies the gasket connection 108 to be evaluated and selects physical measurement information and time history data in the system from the operation history database 201. When the data does not exist or is not available, the simulation unit 210 calculates the virtual sensor value using the virtual sensor. Although it is necessary to detect operation conditions or the like of the fluid in the vicinity of the gasket connection 108 to determine the engineering parameters required for the gasket connection 108, generally, the measurement value of the gasket connection 108 of an actual facility does not exist in many cases. Thus, the simulation unit 210 calculates the state quantity in the vicinity of the gasket connection 108 and the time history data thereof. At this time, the processing cost can be reduced using the virtual sensor model (ML/AI model). The virtual sensor value calculated using the virtual sensor model may be registered in the operation history database 201.

If the time history data of the state quantity in the vicinity of the gasket connection 108 is obtained, loading analysis and fatigue analysis of a gasket material are performed. For example, a gasket material is selected on the basis of a typical material category and FEA/RBFEA/CFD simulation is performed on the series of case studies. FEA/RBFEA simulation includes simulating a steady state and determining the boundary conditions such as an upper limit value of a loading (pressure). CFD simulation includes performing dynamic simulation and calculating an influence of the operation conditions on the gasket 104. The deterioration factor, the reduction factor, the repulsive factor, the leakage factor, and the gasket connection reliability LOF index are calculated by making operation conditions and other environmental factors different and performing simulation under various conditions. The deterioration factor and the reduction factor relate to the gasket material and the repulsive factor and the leakage factor relate to the connection. The gasket connection reliability LOF index value is a factor in which a state of a comprehensive health of the gasket connection 108 is predicted.

Two ML/AI models, a database and a library for gasket connection boundary conditions such as a repulsive factor, a leakage factor, a loading limit value, and the like, a database and a library about a deterioration factor, a reduction factor, and a fatigue limit value, and a reliability ML/AI model are created through the loading analysis to the gasket connection 108 based on the FEA/RBFEA/CFD simulation and the fatigue state analysis of the gasket material. If these models, databases, and libraries are created, a reliability of the gasket connection 108 to be monitored can be evaluated quickly and at a low cost using various models, databases, and libraries in online monitoring. In order to maintain the accuracy of various models, libraries, and the like, various models, databases, and libraries may be updated periodically or irregularly.

In an online monitoring scene, the operation conditions in the vicinity of the gasket connection 108, the gasket loading analysis results, the material categories and fatigue analysis results, the gasket pressure boundary (limit value of the loading), the temperature boundary (limit value of the temperature), the deterioration factor, the reduction factor, the repulsive factor, the leakage factor, and the like based on a history of the quantity of state in the vicinity of the gasket connection 108 using the virtual sensor model and a history up to now from various ML/AI models, databases, and libraries are calculated. Furthermore, when these parameters are input to the reliability ML/AI model, the gasket connection reliability LOF index indicating the comprehensive health of the gasket connection 108 is calculated. An operator can ascertain a current health of the gasket connection 108 based on the history so far with reference to the gasket connection reliability LOF index.

According to the simulation unit 210, it is possible to predict a behavior and a state of the piping system 1 in the future. For example, operation conditions and the like in the future are provided as parameters and the simulation unit 210 is caused to calculate various state quantities in the vicinity of the gasket connection 108 for a predetermined period in the future. Furthermore, the analysis unit 220 predicts the deterioration factor, the reduction factor, the repulsive factor, the leakage factor, and the like after a predetermined period on the basis of the prediction value of the state quantity and calculates the prediction value of the gasket connection reliability LOF index. Thus, it is possible to predict the state and the reliability of the gasket connection 108 in the future.

Figure 8:
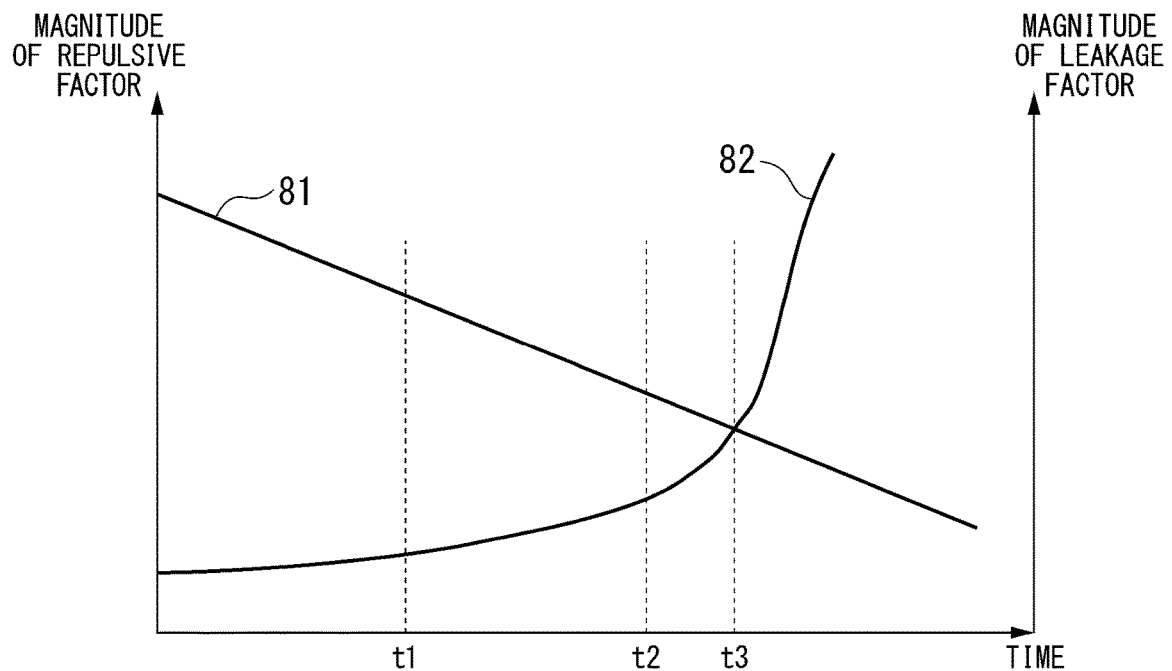
FIG. 8 is a diagram showing an example of change over time in an evaluation index according to the embodiment.

FIG. 8 is a diagram showing an example of a change over time in evaluation index according to the embodiment.

A vertical axis of a graph in FIG. 8 shows magnitudes of a repulsive factor and a leakage factor and a horizontal axis thereof shows a time. As described above, the simulation unit 210 can predict a behavior and a state of the piping system 1 in the future to predict a repulsive factor and a leakage factor in the future. A graph 81 in FIG. 8 shows a transition of a repulsive factor from the past to the future in a predetermined period. The graph 82 shows a transition of a leakage factor from the past to the future in a predetermined period. Values of the repulsive factor and the leakage factor in the graphs 81 and 82 can be calculated on the basis of the loading ML/AI model. A time t1 indicates the present. A time t3 at which the repulsive factor and the leakage factor intersect is a time at which a limit point is indicated and failure of the gasket connection 108 is predicted. The output unit 255 sets a time t2 before the time reaches the time t3 as a period during which an operation can be safely performed and displays a graph illustrated in FIG. 8. Thus, an operator can ascertain that the operation can be safely performed from the present (time t1) to the time t2 in terms of the repulsive factor and the leakage factor.

Figure 9:
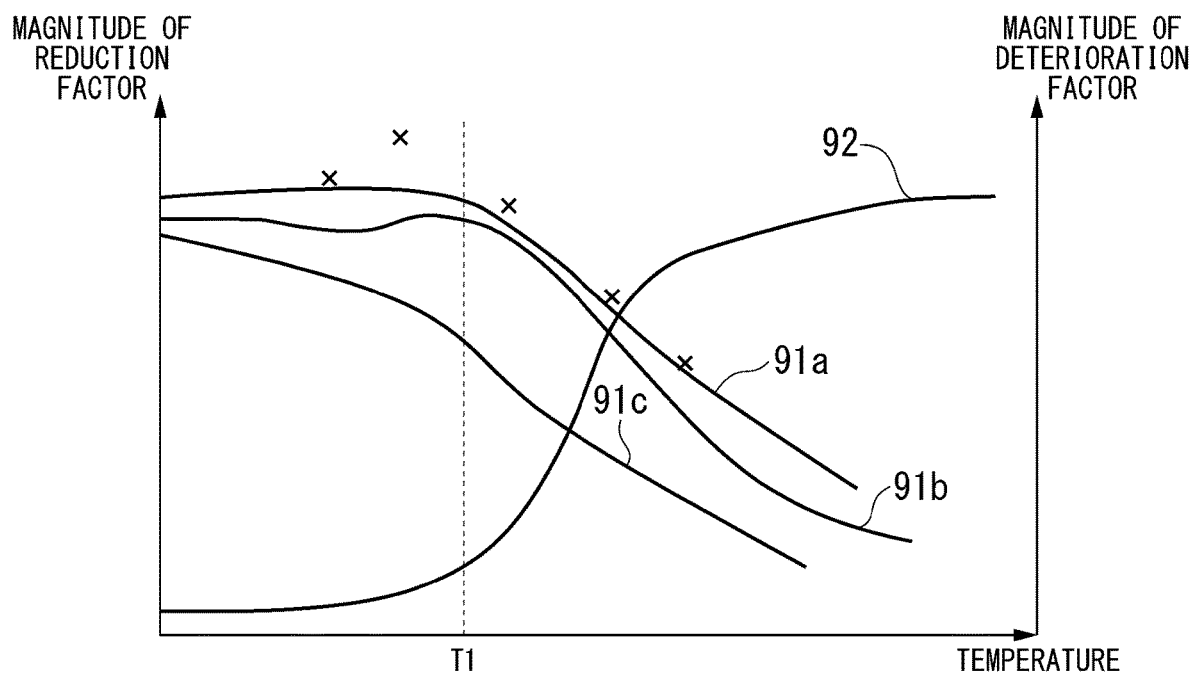
FIG. 9 is a diagram showing an example of temperature change in the evaluation index according to the embodiment.

FIG. 9 is a diagram showing an example of a temperature change of an evaluation index according to the embodiment.

A vertical axis of a graph in FIG. 9 shows magnitudes of a reduction factor and a deterioration factor and a horizontal axis thereof shows a temperature. When the simulation unit 210 changes temperature conditions of the fluid and predicts a behavior and a state of the piping system 1, it is possible to estimate reduction factors and deterioration factors at various temperatures. Graphs 91a to 91c in FIG. 9 show transitions of reduction factors at various temperatures. The reason why the three graphs exist is that the reduction factor is calculated by making conditions other than the temperature different. A x mark in the drawing is a value of a reduction factor calculated under the conditions of an actual environment. Values of the reduction factor and the deterioration factor in the graphs 91a to 91c and 92 can be calculated on the basis of the fatigue ML/AI model. The output unit 255 displays the graphs 91a to 91c and 92. The graph 91a shows a transition closest to a distribution marked by a x mark. Thus, an operator can ascertain a transition of the reduction factor according to the temperature using the graph 91a. The operator ascertains a temperature range in which the reduction factor does not decrease on the basis of the graph 91a. The operator ascertains a temperature range in which the deterioration factor does not increase on the basis of the graph 92. For example, the operator can ascertain that an operation can be safely performed if the temperature is T1 or lower as a temperature range in which the reduction factor does not decrease and the deterioration factor does not increase.

Figure 10:
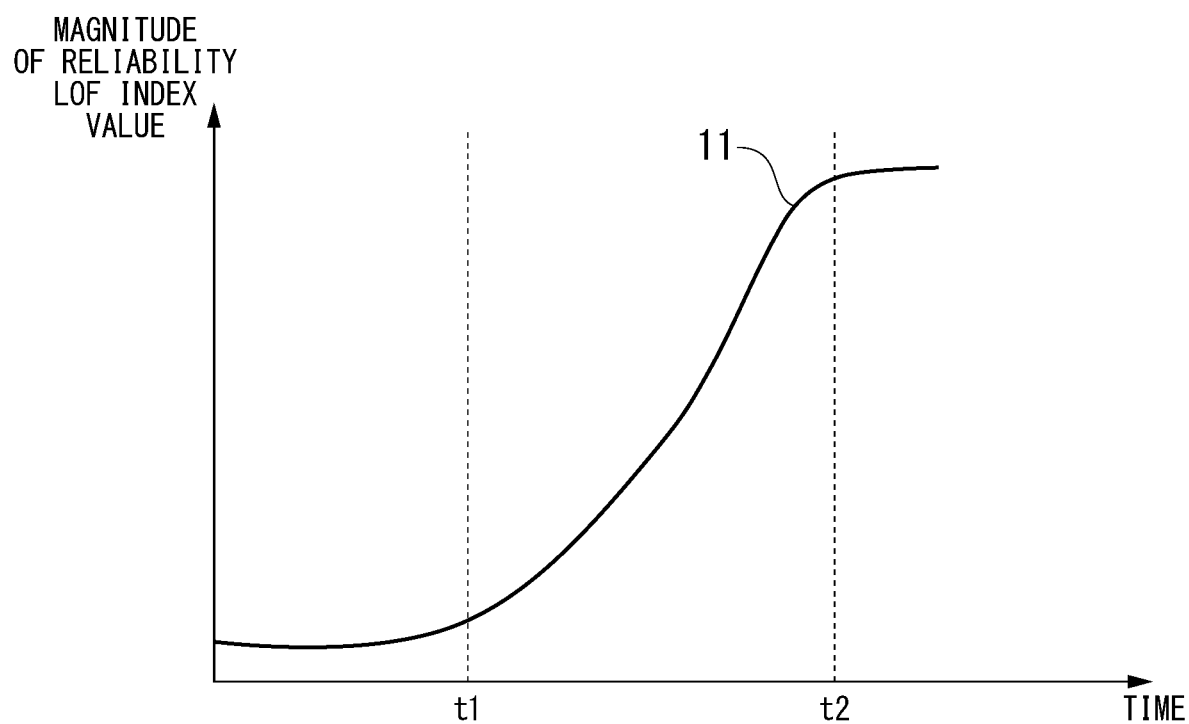
FIG. 10 is a diagram showing an example of temporal change in gasket reliability LOF index value according to the embodiment.

FIG. 10 is a diagram showing an example of changes over time in a gasket connection reliability LOF index value according to the embodiment.

A vertical axis of a graph in FIG. 10 shows a magnitude of a gasket connection reliability LOF index value and a horizontal axis thereof shows a time. When the simulation unit 210 predicts a behavior and a state of the piping system 1 in the future, it is possible to predict the gasket connection reliability LOF index value. A graph 11 in FIG. 10 shows a transition of the gasket connection reliability LOF index value from the past to the future in a predetermined period. The gasket connection reliability LOF index value of the graph 11 can be calculated on the basis of the reliability ML/AI model. The output unit 255 displays the graph illustrated in FIG. 10. A time t1 is the present and a time t2 indicates a time at which the gasket connection reliability LOF index value reaches a safety limit point. An operator can ascertain a period during which a reliability of the gasket connection 108 decreases.

Figure 11:
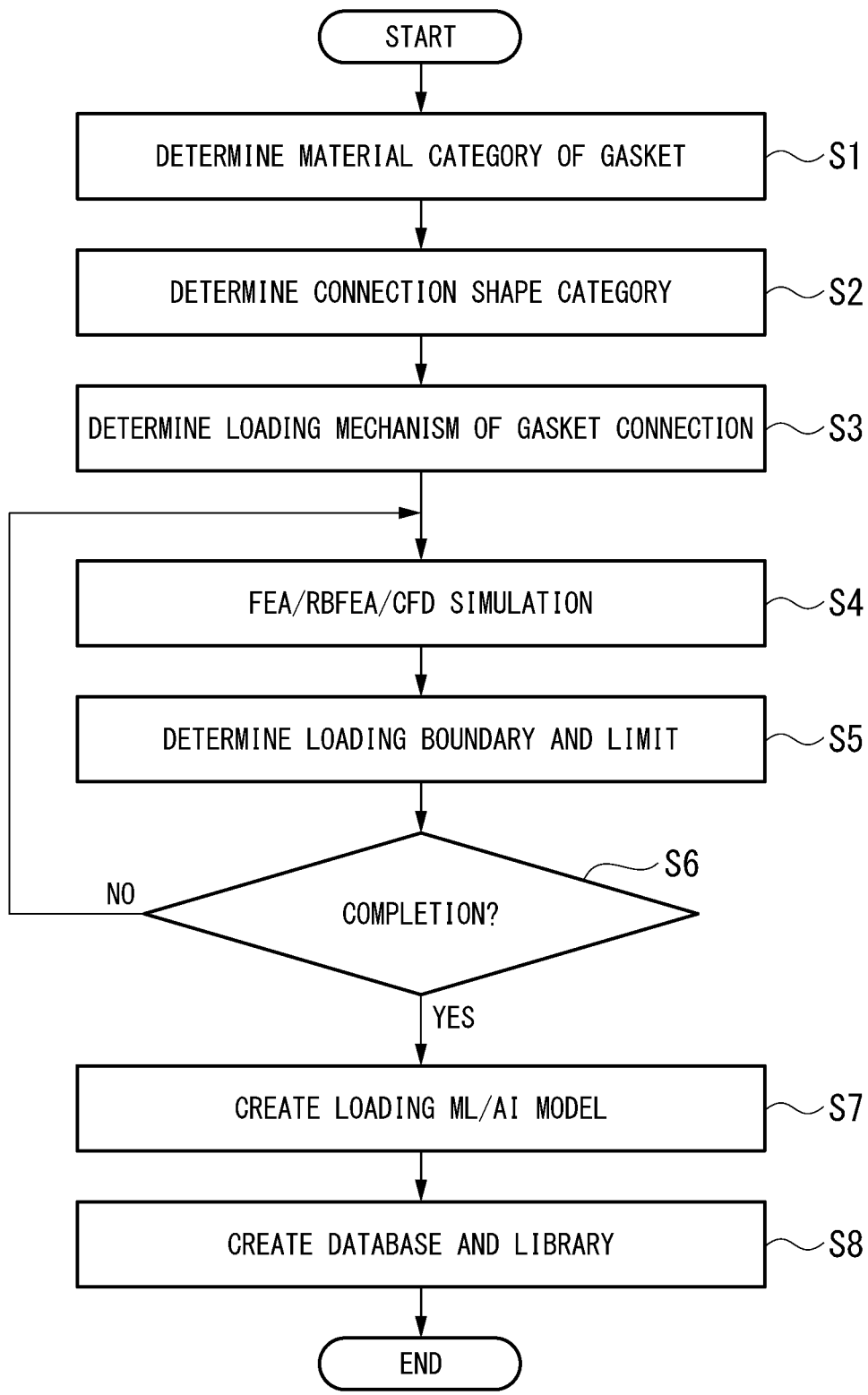
FIG. 11 is a flowchart for describing an example of loading analysis processing according to the embodiment.

FIG. 11 shows a flow of loading analysis processing. FIG. 11 is a flowchart for describing an example of loading analysis processing according to the embodiment. The loading analysis unit 221 performs loading analysis of the gasket connection 108 in accordance with the following procedure. A material category of the gasket 104 is determined (Step S1). Subsequently, a connection shape category of the gasket connection 108 is determined (Step S2). For example, a piping connection structure is determined. Subsequently, a connection loading mechanism of the gasket connection 108 is determined (Step S3). For example, a mechanism in which a loading is applied from the piping connection structure to the gasket connection 108 is determined. Subsequently, FEA/RBFEA structure loading analysis and/or CFD dynamic simulation is performed (Step S4). A simulation is performed on a number of case studies to determine loading boundaries (loading range) and limits (Step S5). A determination concerning whether the simulation is completed is performed (Step S6). When it is determined that the simulation is not completed, the process from Step S4 is repeatedly performed. When it is determined that a plurality of simulations are completed, a loading ML/AI model is created (Step S7). A database and a library in which connection coefficients and loading analysis results are registered are created (Step S8).

Figure 12:
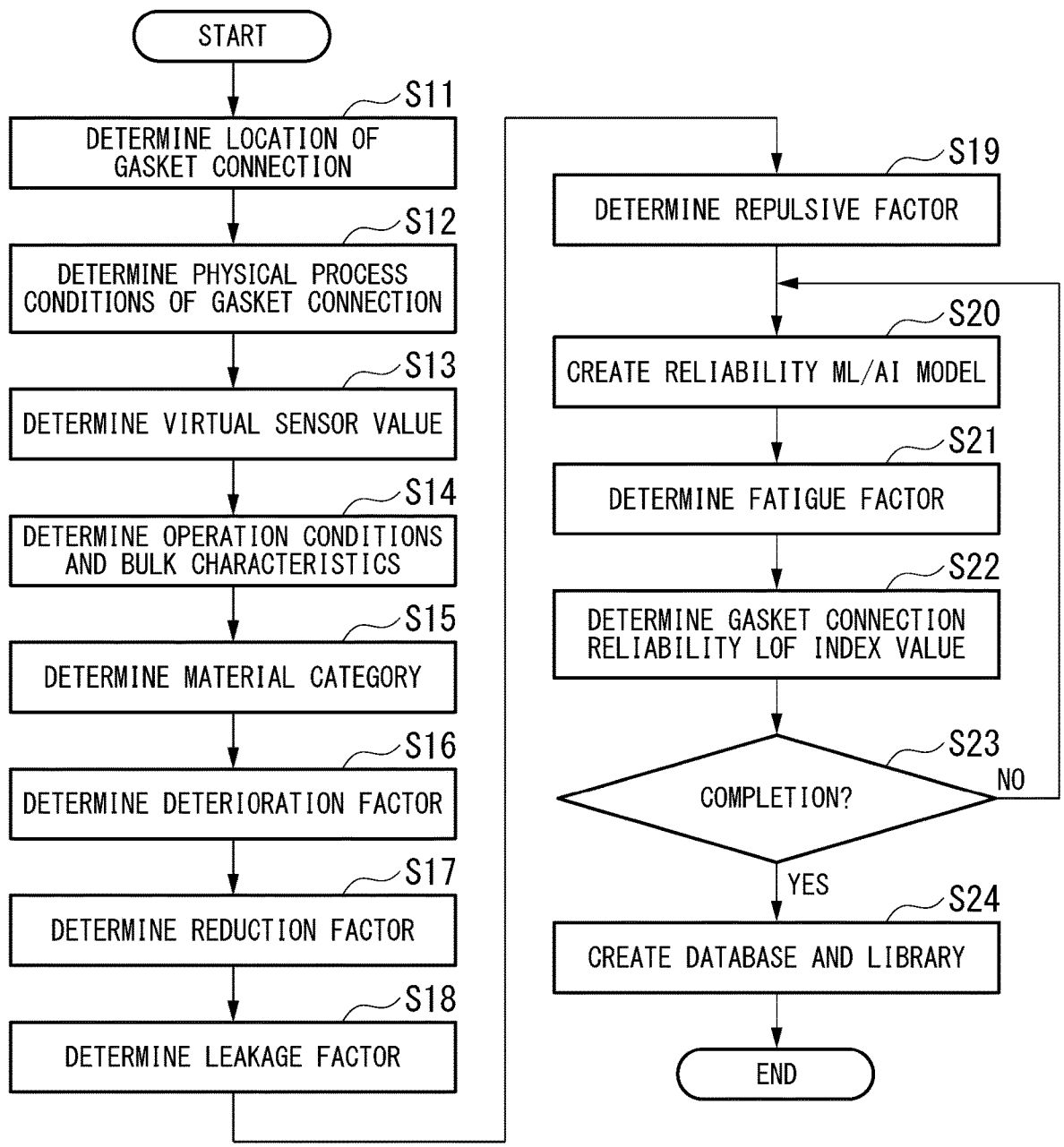
FIG. 12 is a flow chart showing an example of reliability evaluation processing according to the embodiment.

FIG. 12 shows a flow of a process of calculating a gasket connection reliability LOF index value (reliability evaluation processing). FIG. 12 is a flowchart for describing an example of the reliability evaluation processing according to the embodiment.

The data collection/selection unit 200 determines a location of the gasket connection 108 (Step S11). The data collection/selection unit 200 identifies a gasket connection 108 to be evaluated. Subsequently, the data collection/selection unit 200 determines physical process conditions of the gasket connection 108 (Step S12). For example, the data collection/selection unit 200 acquires a measurement value measured by physical real sensors 101 and 107. Subsequently, the simulation unit 210 determines a virtual sensor value of the gasket connection 108 (Step S13). For example, the simulation unit 210 calculates virtual sensor values of the virtual sensors 131 and 141. Subsequently, the simulation unit 210 determines operation conditions and bulk characteristics of the fluid in the vicinity of the gasket connection 108 (Step S14). Subsequently, the analysis unit 220 determines a material category of the gasket 104 (Step S15). Subsequently, the analysis unit 220 determines a deterioration factor (Step S16). Subsequently, the analysis unit 220 determines a reduction factor (Step S17). Subsequently, the analysis unit 220 determines a leakage factor (Step S18). Subsequently, the analysis unit 220 determines a repulsive factor (Step S19). Subsequently, the evaluation unit 250 creates a reliability ML/AI model (Step S20). Subsequently, the evaluation unit 250 determines a fatigue factor on the basis of the reliability ML/AI model (Step S21). Subsequently, the evaluation unit 250 determines a gasket connection reliability LOF index value of a gasket connection 108 to be evaluated on the basis of the reliability ML/AI model (Step S22). A determination concerning whether the reliability evaluation processing is completed is performed (Step S23). When it is determined that the reliability evaluation processing is not completed, the process from Step S20 is repeatedly performed. When it is determined that the reliability evaluation processing is completed, a database and a library in which the gasket connection reliability LOF index value and the fatigue factor are registered are created (Step S24).

With regard to data which is difficult to obtain online, data (lab testing data) obtained by taking a sample and performing analysis on the sample in a laboratory may be input to the loading ML/AI model, the fatigue ML/AI model, and the reliability ML/AI model, as input parameters, in addition to the measurement value and the virtual sensor value of the real sensors 101 and 107. Thus, it is possible to output a more accurate prediction. Furthermore, a constitution in which the process works with a monitoring system configured to monitor the plant including the piping system 1 and the output unit 255 outputs the gasket connection reliability LOF index value, the reduction factor, the deterioration factor, the leakage factor, the repulsive factor, the fatigue factor, the graphs of FIGS. 8 to 10, and the like to the monitoring system may be provided. The monitoring system may display these information output from the gasket connection reliability evaluation system 2 on a monitoring screen as they are and perform failure diagnosis of the entire plant 3 and the evaluation of the productivity and economic efficiency of the products produced in the plant 3 using the gasket connection reliability LOF index value and the like.

Figure 13:
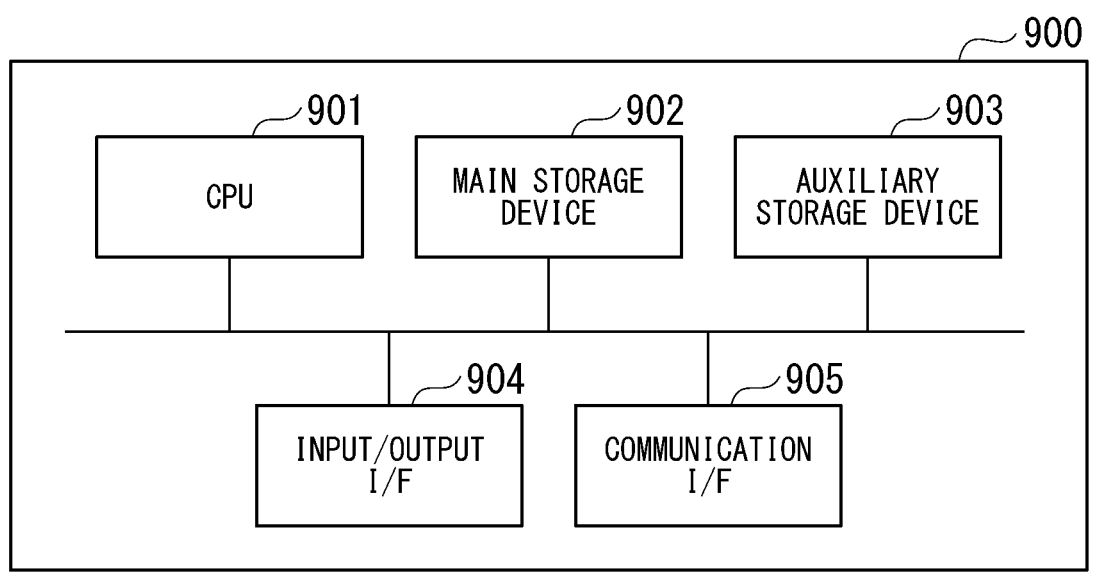
FIG. 13 is a diagram showing an example of a hardware constitution of a gasket reliability evaluation system according to the embodiment.

FIG. 13 is a diagram showing an example of a hardware constitution of the gasket connection reliability evaluation system 2 according to each embodiment.

A computer 900 includes a CPU 901, a main storage device 902, an auxiliary storage device 903, an input/output interface 904, and a communication interface 905.

The gasket connection reliability evaluation system 2 described above is installed in the computer 900. Furthermore, each of the above-described functions is stored in the auxiliary storage device 903 in the form of a program. The CPU 901 reads the program from the auxiliary storage device 903, develops the program to the main storage device 902, and performs the above processing in accordance with the program. The CPU 901 secures a storage region in the main storage device 902 in accordance with the program. The CPU 901 secures a storage region for storing data being processed in the auxiliary storage device 903 in accordance with the program.

Processes using the function units may be performed by recording a program for realizing all or a part of the functions of the gasket connection reliability evaluation system 2 on a computer-readable recording medium, loading the program recorded on the recording medium into the computer system, and executing the program. A "computer system" described herein is defined to include an OS and hardware such as peripheral devices. The "computer system" is defined to include a homepage providing environment (or display environment) as well when a WWW system is used. A "computer-readable recording medium" refers to a storage device such as a portable medium such as a CD, a DVD, and USB and a hard disk built in the computer system. When the program is delivered to the computer 900 over a communication circuit, the computer 900 which receives the delivering may develop the program in the main storage device 902 and perform the above processes. The above program may be for realizing a part of the above-described functions. In addition, the above-described functions may be realized in combination with the program already recorded on the computer system.

As described above, although some embodiments according to the present disclosure have been explained, all of these embodiments are presented as examples and are not intended to limit the scope of the invention. These embodiments can be performed in a variety of other forms and various omissions, replacements, and changes are possible without departing from the gist of the invention. These embodiments and variations thereof are included in the scope of the invention described in the claims and the equivalent scope thereof, as are included in the scope and gist of the invention.

<Supplementary Note>

The gasket connection reliability evaluation system, the gasket connection reliability evaluation method, and the program described in each of the embodiments are ascertained, for example, as follows.

(1) A gasket connection reliability evaluation system according to a first aspect includes: a measurement value acquisition unit configured to acquire a measurement value obtained through measurement by a sensor provided in a system including piping connections with gaskets; a simulation unit configured to simulate a behavior of a fluid flowing through the system on the basis of the measurement value and calculate a state quantity relating to the fluid; a loading analysis unit configured to analyze a loading applied to each of the gaskets on the basis of the measurement value and the state quantity and calculate a connection index of the gasket; a fatigue analysis unit configured to analyze a fatigue state of the gasket on the basis of the measurement value, the state quantity, the loading applied to the gasket, and a specifications and condition of the gasket connection (flanges 103 and 105) and calculate a deterioration index of the gasket; and a reliability evaluation unit configured to calculate a reliability of the gasket on the basis of the measurement value, the state quantity, the connection index, the deterioration index, and a predetermined reliability evaluation model.

Thus, it is possible to evaluate a reliability of the gasket connection 108.

(2) A gasket connection reliability evaluation system according to a second aspect is the gasket connection reliability evaluation system of (1), in which the reliability evaluation unit evaluates a reliability of the system on the basis of the reliability of each of the gaskets included in the system.

Thus, it is possible to evaluate a reliability of a plurality of gasket connections in the entire piping system even when the piping system includes the gasket connections.

(3) A gasket connection reliability evaluation system according to a third aspect is the gasket connection reliability evaluation system of (1) or (2), in which the measurement value and the state quantity include at least one of operation conditions, physical properties, and a chemical composition of a fluid flowing through the system.

It is possible to perform loading analysis applied to the gasket connection and fatigue analysis on the basis of the operation conditions, the physical properties, the chemical composition, and the like of a fluid in the vicinity of the gasket connection.

(4) A gasket connection reliability evaluation system according to a fourth aspect is the gasket connection reliability evaluation system of any one of (1) to (3), in which the operation conditions include at least one of a temperature, a pressure, and a flow rate, the physical properties include at least one of a gas/liquid ratio, a density, a viscosity, and specific heat, and the chemical composition contains at least one of $H_2O$, $CO_2$, $N_2$, hydrocarbons, sand, and other impurities.

It is possible to estimate the state quantity (virtual sensor value) in the vicinity of the gasket connection and perform loading analysis applied to the gasket connection and fatigue analysis in consideration of these factors.

(5) A gasket connection reliability evaluation system according to a fifth aspect is the gasket connection reliability evaluation system of any one of (1) to (4), in which the connection index is a repulsive factor and a leakage factor of the gasket.

Thus, it is possible to evaluate a reliability and health of the gasket connection.

(6) A gasket connection reliability evaluation system according to a sixth aspect is the gasket connection reliability evaluation system of any one of (1) to (5), in which the deterioration index includes a deterioration factor and a reduction factor of the gasket.

Thus, it is possible to evaluate a reliability and health of a gasket material.

(7) A gasket connection reliability evaluation system according to a seventh aspect is the gasket connection reliability evaluation system of any one of (1) to (6), in which the reliability evaluation unit evaluates an operable period on the basis of transition of the connection index in time series.

As illustrated in FIG. 8, it is possible to evaluate an operable period on the basis of a transition of a connection index in time series.

(8) A gasket connection reliability evaluation system according to an eighth aspect is the gasket connection reliability evaluation system of any one of (1) to (7), in which the reliability evaluation unit evaluates an available temperature range on the basis of the deterioration index for each temperature.

As illustrated in FIG. 9, it is possible to evaluate an available temperature range on the basis of a temperature transition of a deterioration index.

(9) A gasket connection reliability evaluation system according to a ninth aspect is the gasket connection reliability evaluation system of any one of (1) to (8), which further includes: an output unit configured to output at least one of the state quantity calculated by the simulation unit, the connection index calculated by the loading analysis unit, the deterioration index calculated by the fatigue analysis unit, and the reliability calculated by the reliability evaluation unit.

Thus, it is possible to monitor a current state of the gasket connection. For example, if any of the connection index, the deterioration index, and the reliability evaluation result approaches the limit point, it is possible to consider replacement of the like of the gasket and prevent an accident due to fluid leakage or the like from occurring.

(10) A gasket connection reliability evaluation system according to a tenth aspect is the gasket connection reliability evaluation system of any one of (1) to (9), in which the simulation unit calculates the state quantity at a position at which a sensor is unable to be provided upstream or downstream of the gasket.

Although detecting the fluid state quantity in the vicinity of the gasket connection is required to monitor the gasket connection, it is not possible to perform measurement using the sensor in the vicinity of the gasket connection in an actual facility in many cases. The simulation unit can evaluate and monitor the gasket connection state by calculating the state quantity in the vicinity of the gasket connection.

(11) A gasket connection reliability evaluation system according to an eleventh aspect is the gasket connection reliability evaluation system of any one of (1) to (10), in which the simulation unit predicts the state quantity, the loading analysis unit predicts the connection index on the basis of a prediction value of the state quantity, the fatigue analysis unit predicts the deterioration index on the basis of the prediction value of the state quantity, and the reliability evaluation unit calculates a prediction value of a reliability of the gasket on the basis of the prediction value of the state quantity, a prediction value of the connection index, a prediction value of the deterioration index, and the reliability evaluation model.

Thus, it is possible to predict the gasket connection state in the future and ascertain in advance a period during which the gasket connection will be in a dangerous state.

(12) A gasket connection reliability evaluation method according to a twelfth aspect is a gasket connection reliability evaluation method which includes: a step of acquiring a measurement value obtained through measurement by a sensor provided in a system including piping connections with gaskets; a step of simulating a behavior of a fluid flowing through the system on the basis of the measurement value and calculating a state quantity relating to the fluid; a step of analyzing a loading applied to each of the gaskets on the basis of the measurement value and the state quantity and calculating a connection index of the gasket; a step of analyzing a fatigue state of the gasket on the basis of the measurement value, the state quantity, the loading applied to the gasket, and a specifications and condition of the gasket connection and calculating a deterioration index of the gasket; and a step of calculating a reliability of the gasket on the basis of the measurement value, the state quantity, the connection index, the deterioration index, and a predetermined reliability evaluation model.

[0 0 0 3]

(13) A program according to a thirteenth aspect is a program causing a computer to execute: a step of acquiring a measurement value obtained through measurement by a sensor provided in a system including piping connections with gaskets; a step of simulating a behavior of a fluid flowing through the system on the basis of the measurement value and calculating a state quantity relating to the fluid; a step of analyzing a loading applied to each of the gaskets on the basis of the measurement value and the state quantity and calculating a connection index of the gasket; a step of analyzing a fatigue state of the gasket on the basis of the measurement value, the state quantity, the loading applied to the gasket, and a specifications and condition of the gasket connection and calculating a deterioration index of the gasket; and a step of calculating a reliability of the gasket on the basis of the measurement value, the state quantity, the connection index, the deterioration index, and a predetermined reliability evaluation model.

EXPLANATION OF REFERENCES

1 Piping system
102 Piping
103 Flange
104 Gasket
105 Flange
106 Piping
101 Real sensor
131 Virtual sensor
141 Virtual sensor
107 Real sensor
2 Gasket connection reliability evaluation system
200 Data collection/selection unit
201 Operation history database
203 Gasket connection database
210 Simulation unit
211 Simulation result comparison unit
213 Simulation model
220 Analysis unit 221 Loading analysis unit
223 Fatigue analysis unit
250 Evaluation unit
251 Reliability evaluation unit
253 IOW information integration unit
255 Output unit
900 Computer
901 CPU
902 Main storage device
903 Auxiliary storage device
904 Input/output interface
905 Communication interface

What is claimed is:

1. A gasket connection reliability evaluation system comprising:
    a measurement value acquisition unit configured to acquire a measurement value obtained through measurement by a sensor provided in a system including piping connections with gaskets;
    a simulation unit configured to simulate a behavior of a fluid flowing through the system on the basis of the measurement value and calculate a state quantity relating to the fluid;
    a loading analysis unit configured to analyze a loading applied to each of the gaskets on the basis of the measurement value and the state quantity and calculate a connection index of the gasket;
    a fatigue analysis unit configured to analyze a fatigue state of the gasket on the basis of the measurement value, the state quantity, the loading applied to the gasket, and a specifications and condition of the gasket connection and calculate a deterioration index of the gasket; and
    a reliability evaluation unit configured to calculate a reliability of the gasket on the basis of the measurement value, the state quantity, the connection index, the deterioration index, and a predetermined reliability evaluation model.

2. The gasket connection reliability evaluation system according to claim 1, wherein the reliability evaluation unit evaluates a reliability of the system on the basis of the reliability of each of the gaskets included in the system.

3. The gasket connection reliability evaluation system according to claim 1, wherein the measurement value and the state quantity include at least one of operation conditions, physical properties, and a chemical composition of a fluid flowing through the system.

4. The gasket connection reliability evaluation system according to claim 3, wherein the operation conditions include at least one of a temperature, a pressure, and a flow rate,
    the physical properties include at least one of a gas/liquid ratio, a density, a viscosity, and specific heat, and
    the chemical composition contains at least one of $H_2O$, $CO_2$, $N_2$, hydrocarbons, sand, and other impurities.

5. The gasket connection reliability evaluation system according to claim 1, wherein the connection index is a repulsive factor and a leakage factor of the gasket.

6. The gasket connection reliability evaluation system according to claim 1, wherein the deterioration index includes a deterioration factor and a reduction factor of the gasket.

7. The gasket connection reliability evaluation system according to claim 1, wherein the reliability evaluation unit evaluates an operable period on the basis of transition of the connection index in time series.

8. The gasket connection reliability evaluation system according to claim 1, wherein the reliability evaluation unit evaluates an available temperature range on the basis of the deterioration index for each temperature.

9. The gasket connection reliability evaluation system according to claim 1, further comprising:
    an output unit configured to output at least one of the state quantity calculated by the simulation unit, the connection index calculated by the loading analysis unit, the deterioration index calculated by the fatigue analysis unit, and the reliability calculated by the reliability evaluation unit.

10. The gasket connection reliability evaluation system according to claim 1, wherein the simulation unit calculates the state quantity at a position at which a sensor is unable to be provided upstream or downstream of the gasket.

11. The gasket connection reliability evaluation system according to claim 1, wherein the simulation unit predicts the state quantity,
    the loading analysis unit predicts the connection index on the basis of a prediction value of the state quantity,
    the fatigue analysis unit predicts the deterioration index on the basis of the prediction value of the state quantity, and
    the reliability evaluation unit calculates a prediction value of a reliability of the gasket on the basis of the prediction value of the state quantity, a prediction value of the connection index, a prediction value of the deterioration index, and the reliability evaluation model.

12. A gasket connection reliability evaluation method comprising:
    a step of acquiring a measurement value obtained through measurement by a sensor provided in a system including piping connections with gaskets;
    a step of simulating a behavior of a fluid flowing through the system on the basis of the measurement value and calculating a state quantity relating to the fluid;
    a step of analyzing a loading applied to each of the gaskets on the basis of the measurement value and the state quantity and calculating a connection index of the gasket;
    a step of analyzing a fatigue state of the gasket on the basis of the measurement value, the state quantity, the loading applied to the gasket, and a specifications and condition of the gasket connection and calculating a deterioration index of the gasket; and
    a step of calculating a reliability of the gasket on the basis of the measurement value, the state quantity, the connection index, the deterioration index, and a predetermined reliability evaluation model.

13. A program causing a computer to execute:
    a step of acquiring a measurement value obtained through measurement by a sensor provided in a system including piping connections with gaskets;
    a step of simulating a behavior of a fluid flowing through the system on the basis of the measurement value and calculating a state quantity relating to the fluid;
    a step of analyzing a loading applied to each of the gaskets on the basis of the measurement value and the state quantity and calculating a connection index of the gasket;
    a step of analyzing a fatigue state of the gasket on the basis of the measurement value, the state quantity, the loading applied to the gasket, and a specifications and condition of the gasket connection and calculating a deterioration index of the gasket; and a step of calculating a reliability of the gasket on the basis of the measurement value, the state quantity, the connection index, the deterioration index, and a predetermined reliability evaluation model.

\* \* \* \* \*